(12) United States Patent
Yasuda et al.

(10) Patent No.: US 11,718,388 B2
(45) Date of Patent: Aug. 8, 2023

(54) FLOW CONTROL METHOD AND ROTARY WING UNIT

(71) Applicants: KAWASAKI JUKOGYO KABUSHIKI KAISHA, Kobe (JP); TOHOKU UNIVERSITY, Sendai (JP)

(72) Inventors: Hidemasa Yasuda, Kobe (JP); Akio Ochi, Kobe (JP); Kenji Hayama, Kobe (JP); Tomoka Tsujiuchi, Kobe (JP); Kazuyuki Nakakita, Inagi (JP); Taku Nonomura, Sendai (JP); Atsushi Komuro, Sendai (JP); Keisuke Takashima, Sendai (JP)

(73) Assignees: KAWASAKI JUKOGYO KABUSHIKI KAISHA, Kobe (JP); TOHOKU UNIVERSITY, Sendai (JP)

( * ) Notice: Subject to any disclaimer, the term of this patent is extended or adjusted under 35 U.S.C. 154(b) by 110 days.

(21) Appl. No.: 17/508,638

(22) Filed: Oct. 22, 2021

(65) Prior Publication Data

US 2022/0041269 A1 Feb. 10, 2022

Related U.S. Application Data

(63) Continuation of application No. 17/601,396, filed as application No. PCT/JP2020/015207 on Apr. 2, 2020.

(30) Foreign Application Priority Data

Apr. 2, 2019 (JP) .................. 2019-070570

(51) Int. Cl.
*B64C 23/00* (2006.01)
*B64C 23/04* (2006.01)
*B64C 27/04* (2006.01)

(52) U.S. Cl.
CPC ............ *B64C 23/04* (2013.01); *B64C 23/005* (2013.01); *B64C 27/04* (2013.01); *B64C 2230/12* (2013.01); *B64C 2230/28* (2013.01)

(58) Field of Classification Search
CPC ..................... B64C 23/005; B64C 2230/28
See application file for complete search history.

(56) References Cited

U.S. PATENT DOCUMENTS 8,674,537 B2 * 3/2014 Tanaka ............... F03D 7/0256
                                                    290/55
11,214,359 B2 * 1/2022 Kikuchi ................. B64C 13/50
(Continued)

FOREIGN PATENT DOCUMENTS

| JP | 2009-511360 A | 3/2009 |
| JP | 2015-161269 A | 9/2015 |
| WO | 2007/133239 A2 | 11/2007 |

OTHER PUBLICATIONS

Patel, Ng, Vasudevan, corke, Post, McLaughlin, Suchomel; Scaling Effects of an Aerodynamic Plasma Actuator; Feb. 2008, Journal of Aircraft, vol. 45, No. 1, pp. 1-14 (Year: 2008).*

*Primary Examiner* — Brady W Frazier
*Assistant Examiner* — Shanna Danielle Glover
(74) *Attorney, Agent, or Firm* — Oliff PLC (57) ABSTRACT

A flow control method is a flow control method of controlling flow around a blade of a rotary wing, a plasma actuator being disposed at the blade. The flow control method includes: determining a characteristic frequency ratio that is a characteristic value among frequency ratios, each of the frequency ratios being a ratio between an actuator driving frequency and an angle of attack changing frequency, the actuator driving frequency being a frequency of an applied voltage applied to the plasma actuator, the angle of attack changing frequency being a frequency at which an angle of attack of the blade changes in accordance with a rotation (Continued)

angle of the blade; setting the actuator driving frequency such that the frequency ratio becomes the characteristic frequency ratio; and applying a voltage of the set actuator driving frequency to the plasma actuator to control the flow around the blade.

6 Claims, 5 Drawing Sheets

(56) References Cited

U.S. PATENT DOCUMENTS

| | | | |
|---|---|---|---|
| 2008/0116808 A1* | 5/2008 | McClure | F15D 1/12 |
| | | | 315/111.61 |
| 2008/0122252 A1* | 5/2008 | Corke | H05H 1/2439 |
| | | | 296/180.1 |
| 2010/0224733 A1 | 9/2010 | Wood et al. | |

* cited by examiner

FLOW CONTROL METHOD AND ROTARY WING UNIT

CROSS-REFERENCE TO RELATED APPLICATION

This is a Continuation of application Ser. No. 17/601,396 filed Oct. 4, 2021, which claims priority to PCT/JP2020/015207 filed Apr. 2, 2020, and JP 2019-070570 filed Apr. 2, 2019, both of which are incorporated herein by reference.

BACKGROUND OF THE INVENTION

1. Field of the Invention

The present disclosure relates to a flow control method and a rotary wing unit, particularly to a method and a rotary wing unit each of which controls flow around a blade of a rotary wing and is capable of easily setting driving of a plasma actuator.

2. Description of the Related Art

Helicopters, wind power generation facilities, and the like may include cyclic pitch mechanisms. The cyclic pitch mechanism is a mechanism that periodically changes a pitch angle of a blade constituting a rotary wing. For example, when the blade is at such an angular position that lift is hardly obtained, the cyclic pitch mechanism increases the pitch angle of the blade to increase a lift coefficient. However, when the pitch angle of the blade increases, air current flowing along the surface of the blade may separate from the blade, and the blade may stall. The stall of the blade is permitted to some extent. However, when an area or a period of time in which the stall occurs increases, the effect obtained by the cyclic pitch mechanism cannot be adequately achieved.

In recent years, as a device that suppresses the stall of the blade, a plasma actuator is gathering attention. The plasma actuator is a device that generates plasma by applying to an electrode pair a voltage that changes with time. When the plasma is generated in the vicinity of a front edge of the blade by the plasma actuator, air flow is induced or shock waves are generated in the vicinity of the front edge of the blade. By disturbance generated by the flow or the shock waves or spatial/temporal changes in a flow field, the separation of the air current from the blade is suppressed, and the stall of the blade is suppressed. Typically, a changing voltage is intermittently and periodically applied to the electrode pair. Moreover, it is said that: it is desirable that a frequency at which the changing voltage is intermittently applied to the electrode pair, i.e., a frequency (hereinafter referred to as an "actuator driving frequency") at which the plasma actuator is driven be set in accordance with, for example, a relative speed of air relative to the blade; and by setting the actuator driving frequency as above, the stall is effectively suppressed (see Published Japanese Translation of PCT Application No. 2009-511360 and Japanese Laid-Open Patent Application Publication No. 2015-161269, for example).

SUMMARY OF THE INVENTION

A flow control method according to one aspect of the present disclosure is a flow control method of controlling flow around a blade of a rotary wing, a plasma actuator being disposed at the blade. The flow control method includes: determining a characteristic frequency ratio that is a characteristic value among frequency ratios, each of the frequency ratios being a ratio between an actuator driving frequency and an angle of attack changing frequency, the actuator driving frequency being a frequency of an applied voltage applied to the plasma actuator, the angle of attack changing frequency being a frequency at which an angle of attack of the blade changes in accordance with a rotation angle of the blade; setting the actuator driving frequency such that the frequency ratio becomes the characteristic frequency ratio; and applying a voltage of the set actuator driving frequency to the plasma actuator to control the flow around the blade.

A rotary wing unit according to another aspect of the present disclosure includes: a rotary wing including a blade; a cyclic pitch controller that periodically changes an angle of attack of the blade at a predetermined angle of attack changing frequency in accordance with a rotation angle of the blade; and a plasma actuator disposed at the blade. A voltage of an actuator driving frequency is applied to the plasma actuator, the actuator driving frequency being a frequency of an applied voltage applied to the plasma actuator, the actuator driving frequency being set such that a frequency ratio that is a ratio between the actuator driving frequency and the angle of attack changing frequency becomes a characteristic frequency ratio that is a characteristic value.

DESCRIPTION OF THE PREFERRED EMBODIMENTS

Hereinafter, an embodiment will be described with reference to the drawings.

Rotary Wing Unit

Figure 1:
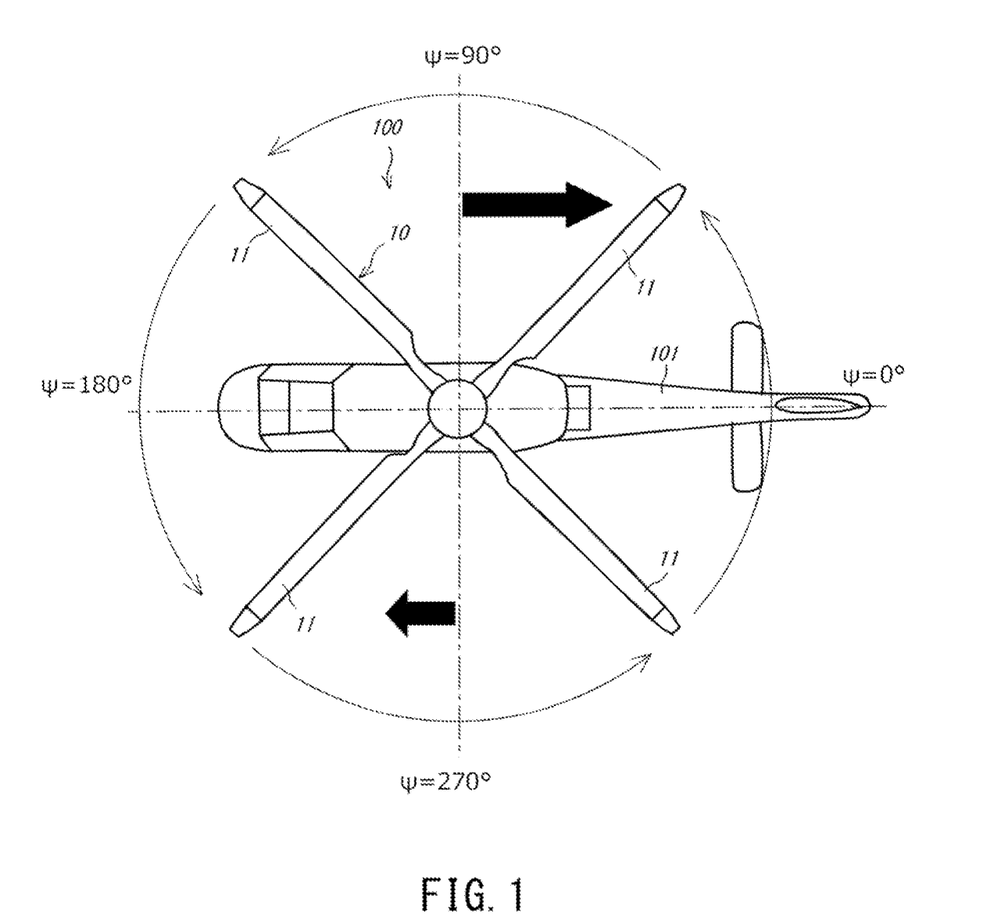
FIG. 1 is a plan view of a helicopter equipped with a rotary wing unit.

FIG. 1 is a plan view of a helicopter 101 equipped with a rotary wing unit 100. The rotary wing unit 100 according to the embodiment is mounted on the helicopter 101. Instead of the helicopter, the rotary wing unit 100 may be disposed at other facilities, such as wind power generation facilities. In the embodiment, a left direction on the paper surface of FIG. 1 corresponds to a front direction of the helicopter 101, i.e., a proceeding direction of the helicopter 101. The rotary wing unit 100 includes a rotary wing 10 including blades 11. The rotary wing 10 rotates counterclockwise in plan view.

The above blades 11 are the same in configuration as each other. Herein, the following will be described while focusing on one of the blades 11. As shown in FIG. 1, a rotation angle (hereinafter referred to as an "azimuth angle ψ") of the blade 11 when the blade 11 extends from a rotational center of the rotary wing 10 toward a rear side of the helicopter 101 is regarded as 0°. In this case, when the helicopter 101 proceeds, a relative speed of air relative to the blade 11 becomes the highest at the azimuth angle ψ of about 90°, and the relative speed of the air relative to the blade 11 becomes the lowest at the azimuth angle ψ of about 270°. Therefore, if a pitch angle of the blade 11 does not change, lift becomes large at a right side in the proceeding direction of the rotary wing 10, and the lift becomes small at a left side in the proceeding direction. Thus, force applied to the rotary wing 10 is unbalanced. In FIG. 1, the sizes of thick arrows schematically indicate the magnitudes of the relative speeds of the air relative to the blade 11 at the azimuth angles ψ of 90° and 270°.

Figure 2:
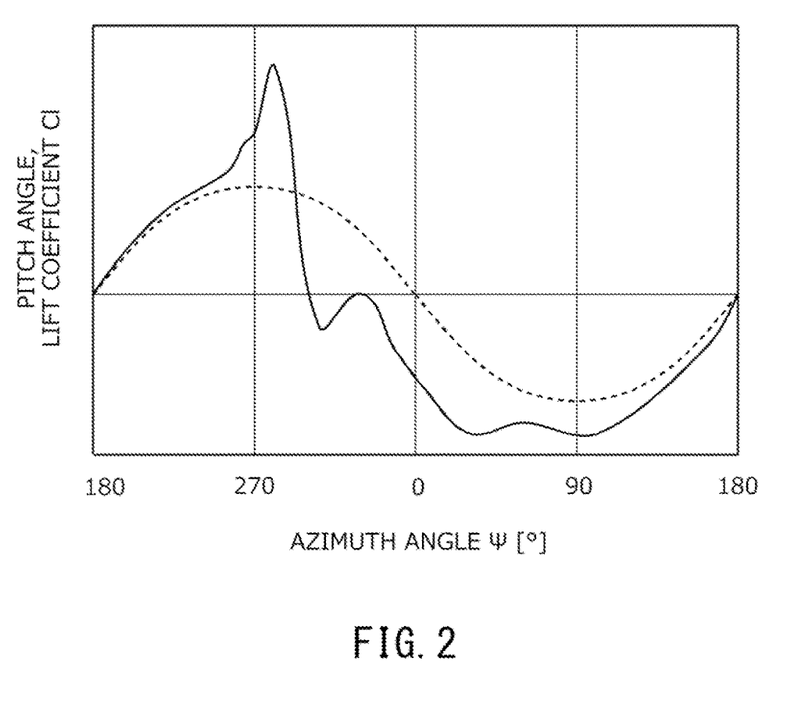
FIG. 2 is a diagram showing one example of a change property of a pitch angle of a blade and one example of a change property of a lift coefficient of the blade.

Therefore, the rotary wing unit 100 according to the embodiment includes a cyclic pitch mechanism (cyclic pitch controller). The cyclic pitch mechanism uses, for example, a mechanical link to change the pitch angle of each blade 11 in accordance with the azimuth angle ψ. FIG. 2 is a diagram showing one example of the pitch angle (angle of attack) of the blade 11 with respect to the azimuth angle ψ and one example of the lift coefficient with respect to the azimuth angle ψ. In FIG. 2, a broken line indicates a change property of the pitch angle, and a solid line indicates a change property of the lift coefficient. The change property of the pitch angle and the change property of the lift coefficient in FIG. 2 are merely examples and do not necessarily coincide with actual change properties. As shown by the broken line in FIG. 2, the pitch angle is controlled so as to become the largest at the azimuth angle ψ of 270° at which the relative speed of the air becomes the lowest. Moreover, the pitch angle is controlled so as to become the smallest at the azimuth angle ψ of 90° at which the relative speed of the air becomes the highest.

By controlling the pitch angle of the blade 11 as above, as shown by the solid line in FIG. 2, the lift coefficient becomes large at the azimuth angle ψ of about 270°, and the lift coefficient becomes small at the azimuth angle ψ of about 90°. As a result, the lift improves in an area (azimuth angle ψ of about 270°) where the relative speed of the air relative to the blade 11 is low. However, as shown by the solid line in FIG. 2, the lift coefficient drastically decreases after the azimuth angle ψ of about 270°. This indicates that since the pitch angle of the blade 11 increases, air current flowing along the surface of the blade 11 separates from the blade 11, and the stall of the blade 11 occurs. When the decrease in the lift coefficient due to the stall is large, it takes time to recover the lift coefficient.

Figure 3:
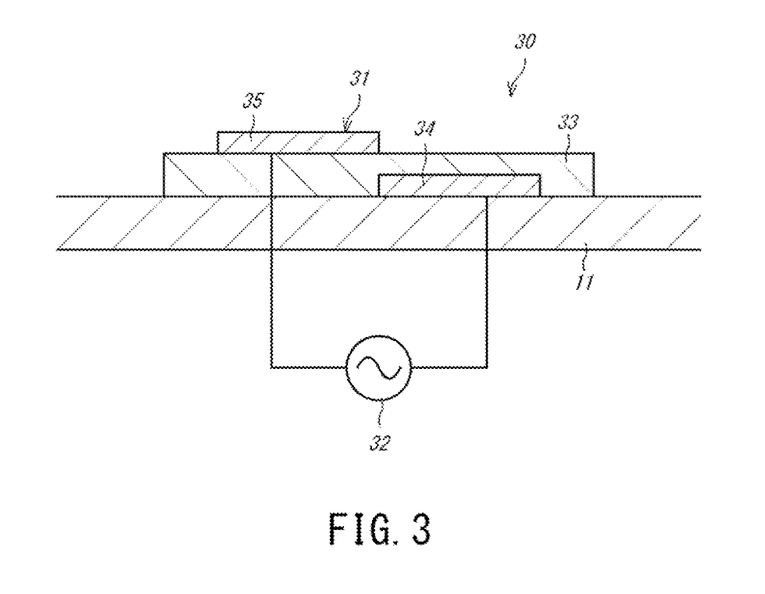
FIG. 3 is a diagram showing a schematic configuration of a plasma actuator.

Therefore, the rotary wing unit 100 according to the embodiment includes a plasma actuator 30 that suppresses the stall of the blade 11 or improves the recovery of the lift of the blade. FIG. 3 is a diagram showing a schematic configuration of the plasma actuator 30. A direction vertical to the paper surface of FIG. 3 corresponds to a span direction (a rotor radial direction or a rotor extending direction) of the blade 11. As shown in FIG. 3, the plasma actuator 30 includes an electrode pair 31 and a power supply 32. The electrode pair 31 is disposed over a substantially entire region of a front edge of the blade 11. The power supply 32 applies a voltage to the electrode pair 31 at a predetermined frequency to drive the plasma actuator 30. The electrode pair 31 may be disposed only at part of the front edge of the blade 11 instead of the entire region of the front edge of the blade 11. The electrode pair 31 does not have to be disposed at the front edge of the blade 11 in the strict sense and may be disposed in a predetermined range including the front edge of the blade 11, i.e., in the vicinity of the front edge.

The electrode pair 31 includes a ground electrode 34 and an exposed electrode 35. The ground electrode 34 is located at the blade 11 and covered with a dielectric 33. The exposed electrode 35 is located outside the dielectric 33. The power supply 32 applies to the electrode pair 31 a voltage that periodically changes. With this, gas between the electrodes becomes plasma (is ionized). To be specific, the plasma is generated. Since plasma particles have electric charge, the plasma particles accelerate by the influence of an electric field and collide with particles around the plasma particles. Thus, flow is induced, or shock waves are generated. By disturbance generated by the flow or the shock waves, the stall of the blade 11 is suppressed. The positions of the ground electrode 34 and the exposed electrode 35 may be reversed. To be specific, the exposed electrode 35 may serve as the ground electrode.

Figure 4:
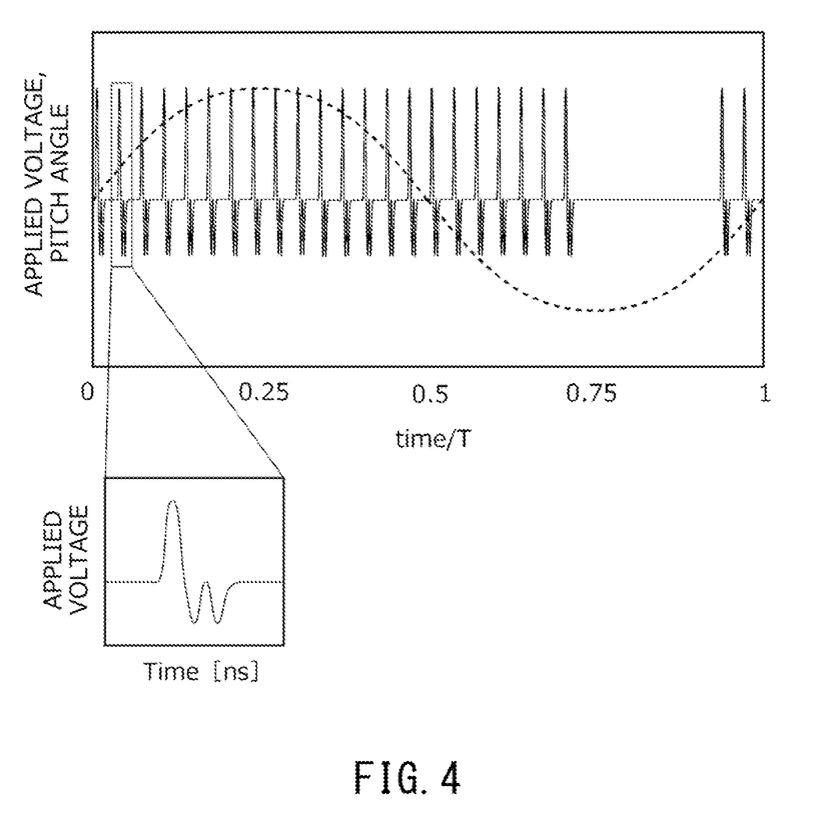
FIG. 4 is a diagram showing one example of a change property of the pitch angle of the blade and one example of a change property of an applied voltage of the plasma actuator.

FIG. 4 is a diagram showing one example of the change property of the pitch angle of the blade 11 and one example of the change property of a voltage (hereinafter referred to as an "applied voltage") applied from the power supply 32 of the plasma actuator 30 to the electrode pair 31. In FIG. 4, a horizontal axis indicates a time (time/T; T denotes a cycle of a blade pitching oscillation), and a vertical axis indicates the pitch angle and the applied voltage. In FIG. 4, a broken line indicates the change property of the pitch angle of the blade 11, and a solid line indicates the applied voltage. The length of the horizontal axis of the graph shown in FIG. 4 corresponds to the length of one cycle of the pitching oscillation of the blade 11.

As shown in FIG. 4, the plasma actuator 30 is a nanosecond pulse driven dielectric barrier discharge plasma actuator (NSDBDPA) in which the waveform of the applied voltage is a pulse wave. The plasma actuator 30 intermittently applies the pulse wave at the actuator driving frequency. However, the plasma actuator 30 may be an alternative current dielectric barrier discharge plasma actuator (ACDBDPA) in which the waveform of the applied voltage is a sine curve. The ACDBDPA applies a sine waveform changing voltage by an intermittent (burst) oscillation mode. A burst frequency that is a frequency of the burst oscillation mode corresponds to the actuator driving frequency herein. The plasma actuator 30 applies the changing voltage of a wavelength of a nanosecond order. In the embodiment, since the stall hardly occurs at about 0.75 time/T (corresponding to the azimuth angle ψ 7 of 90°), the voltage is not applied.

Method of Setting Plasma Actuator

Figure 5:
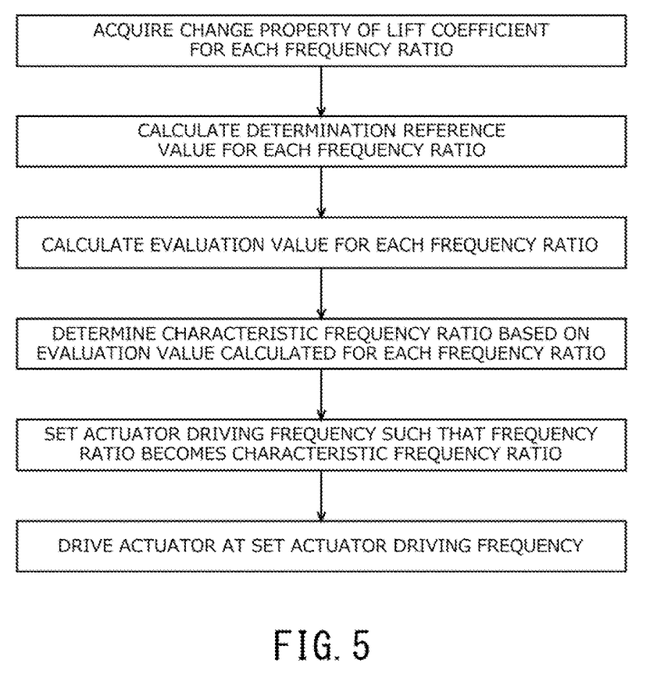
FIG. 5 is a flow chart of a method of setting an actuator driving frequency of the plasma actuator.

Next, a method of setting the plasma actuator 30 will be described. Specifically, a method of setting the frequency (actuator driving frequency) of the applied voltage will be described. FIG. 5 is a flow chart of the method of setting the actuator driving frequency. As shown in FIG. 5, first, the change property of the lift coefficient of the blade 11 is acquired for each frequency ratio. In the embodiment, the change property of the lift coefficient when the plasma actuator 30 is driven and the change property of the lift coefficient when the plasma actuator 30 is not driven are acquired for each frequency ratio. The change property of the lift coefficient may be acquired by experiments or simulation. Moreover, when acquiring the change property of the lift coefficient by experiments, the change property of the lift coefficient may be acquired based on an average value of values obtained by the experiments performed plural times.

Herein, the "frequency ratio" denotes a ratio ($f_{PA}/f_{pitch}$) of an actuator driving frequency ($f_{PA}$) to a pitch changing frequency ($f_{pitch}$). In other words, the frequency ratio is a ratio between the actuator driving frequency that is the frequency of the applied voltage applied to the electrode pair 31 of the plasma actuator 30 and an angle of attack changing frequency at which the angle of attack changes in accordance with the rotation angle of the blade 11. The "pitch changing frequency (angle of attack changing frequency)" is defined as the number of changes of the pitch angle per unit time, and the "actuator driving frequency" is defined as the number of changes of the applied voltage per unit time. As described above, in the embodiment, the change property of the lift coefficient is acquired for each frequency ratio. However, the frequency ratio may be changed by changing the actuator driving frequency. Or, the frequency ratio may be changed by changing the pitch changing frequency. In the embodiment, when acquiring the change property of the lift coefficient, the pitch changing frequency used is the same between when the plasma actuator 30 is driven and when the plasma actuator 30 is not driven, and is the same value in an entire frequency ratio range. However, a different value may be suitably used.

Figure 6:
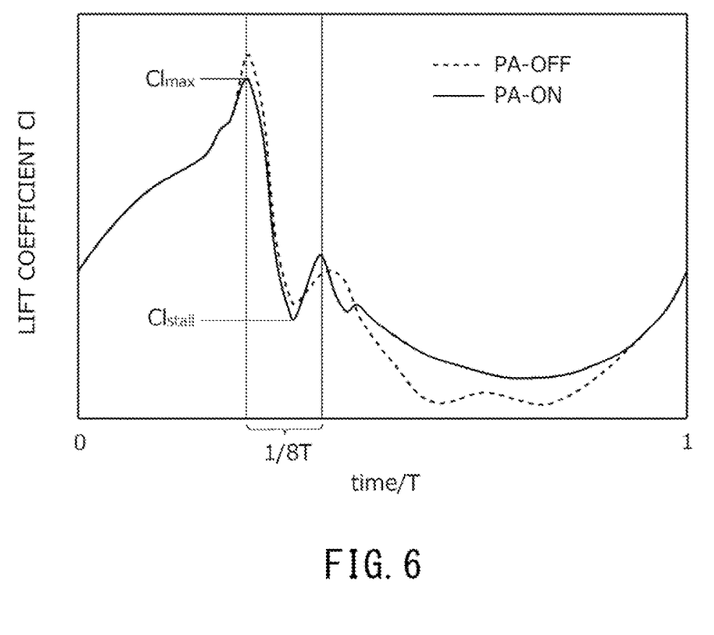
FIG. 6 is a diagram showing one example of a change property of the lift coefficient when the plasma actuator is operated and one example of a change property of the lift coefficient when the plasma actuator is not operated.

FIG. 6 is a diagram showing one example of the change property of the lift coefficient of the blade 11 at a certain frequency ratio. The change property of the lift coefficient as shown in FIG. 6 is acquired for each frequency ratio. The frequency ratio range in which the change of the lift coefficient is acquired will be described later. In FIG. 6, a horizontal axis indicates a time (time/T), and a vertical axis indicates the lift coefficient. In FIG. 6, a broken line indicates the change property when the plasma actuator 30 is not operated, and a solid line indicates the change property when the plasma actuator 30 is operated. The length of the horizontal axis of the graph shown in FIG. 6 corresponds to the length of one cycle of the pitching oscillation of the blade 11. Herein, since the angle of attack of the blade 11 changes in accordance with the change of the pitch angle, one cycle of the pitching oscillation of the blade 11 corresponds to one cycle of the change of the angle of attack.

Next, as shown in FIG. 5, a determination reference value is calculated for each frequency ratio based on the change property of the lift coefficient acquired in advance. Specifically, a first determination reference value g1, a second determination reference value g2, and a third determination reference value g3 are calculated. The determination reference values are as below.

The first determination reference value g1 is a value regarding an integrated value of the lift coefficient per one cycle of the change of the angle of attack. More specifically, the first determination reference value g1 is a value obtained by dividing an integrated value of the lift coefficient per one cycle of the change of the angle of attack when the plasma actuator 30 is driven (hereinafter, this state is shown as a subscript "PA-ON") by an integrated value of the lift coefficient per one cycle of the change of the angle of attack when the plasma actuator 30 is not driven (hereinafter, this state is shown as a subscript "PA-OFF"). When "Cl" denotes the lift coefficient, and "t bar" (i.e., a symbol that is t to which an over line is attached) denotes a time that is made dimensionless by the cycle of the change of the angle of attack, the first determination reference value g1 is calculated by Formula 1 below. When the first determination reference value g1 is large, it means that the lift coefficients become large as a whole when the plasma actuator 30 is driven, which is preferable.

Formula 1

$$g1 = \frac{\left(\int_0^1 C1 * d\bar{t}\right)_{PA-ON}}{\left(\int_0^1 C1 * d\bar{t}\right)_{PA-OFF}} \quad (1)$$

The second determination reference value g2 is a value regarding a maximum value of the lift coefficient in one cycle of the change of the angle of attack. More specifically, the second determination reference value g2 is a value obtained by dividing a maximum value ($Cl_{max}$ in FIG. 6) of the lift coefficient when the plasma actuator 30 is driven by a maximum value of the lift coefficient when the plasma actuator 30 is not driven. When $Cl_{max}$ denotes the maximum value of the lift coefficient, the second determination reference value g2 is calculated by Formula 2 below. When the second determination reference value g2 is large, it means that the maximum value of the lift coefficient when the plasma actuator 30 is driven becomes large, which is preferable.

Formula 2

$$g2 = \frac{(Cl_{max})_{PA-ON}}{(Cl_{max})_{PA-OFF}} \quad (2)$$

The third determination reference value g3 is a value regarding a minimum value of the lift coefficient in a predetermined period of time from a point of time at which the lift coefficient becomes the largest in one cycle of the change of the angle of attack. To be specific, the third determination reference value g3 is a value regarding the lift coefficient that has been decreased by the stall. Specifically, the third determination reference value g3 is a value obtained by dividing a minimum value ($Cl_{stall}$ in FIG. 6) of the lift coefficient in a predetermined period of time (in the embodiment, a ⅛ cycle) from a point of time at which the lift coefficient is the largest when the plasma actuator 30 is driven, by a minimum value of the lift coefficient in a predetermined period of time from a point of time at which the lift coefficient is the largest when the plasma actuator 30 is not driven.

When $Cl_{stall}$ denotes a minimum value of the lift coefficient in a predetermined period of time from a point of time at which the lift coefficient is the largest, the third determination reference value g3 is calculated by Formula 3 below. When the third determination reference value g3 is large, it means that the minimum value of the lift coefficient after the stall when the plasma actuator 30 is driven is large, i.e., the amount of decrease of the lift coefficient after the stall is small, which is preferable. In the embodiment, the above "predetermined period of time from a point of time at which the lift coefficient is the largest" is a ⅛ cycle. However, the above period of time is not limited to this. The above period of time may be set such that a minimum value of the lift coefficient that has been decreased by the stall is included.

Formula 3

$$g3 = \frac{(Cl_{stall})_{PA-ON}}{(Cl_{stall})_{PA-OFF}} \quad (3)$$

Next, as shown in FIG. 5, the evaluation value is calculated for each frequency ratio based on the first determination reference value g1, the second determination reference value g2, and the third determination reference value g3. In the embodiment, a value (product) obtained by multiplying the first determination reference value g1, the second determination reference value g2, and the third determination reference value g3 is an evaluation value g. However, the evaluation value g may be a value (sum) obtained by adding the first determination reference value g1, the second determination reference value g2, and the third determination reference value g3 or may be a value obtained by using one or two of the first determination reference value g1, the second determination reference value g2, and the third determination reference value g3. When using two or more determination reference values, weighting may be performed by, for example, multiplying each determination reference value by a suitable coefficient.

Figure 7:
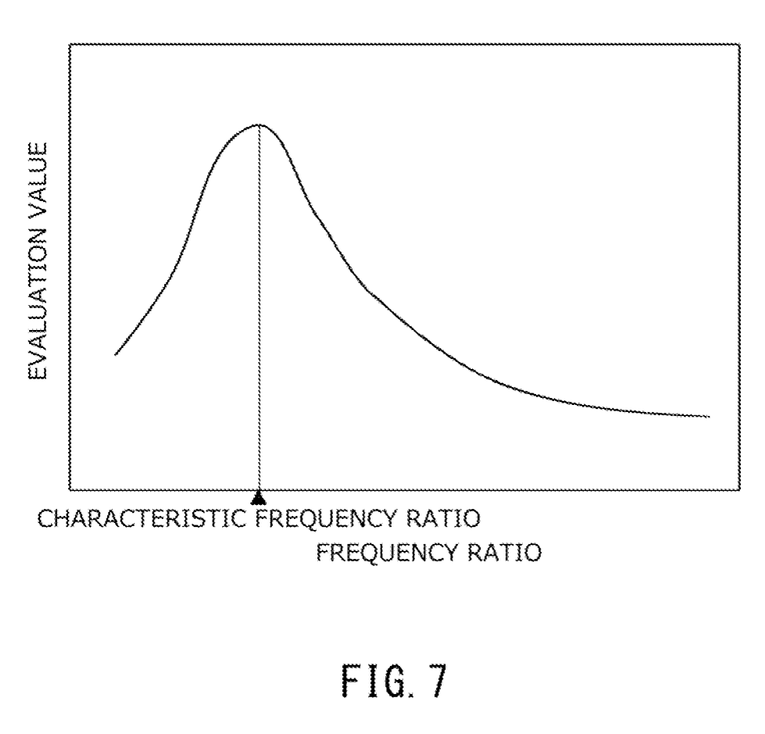
FIG. 7 is a diagram showing a relation of an evaluation value with a frequency ratio.

Next, as shown in FIG. 5, a characteristic frequency ratio is determined based on the evaluation value g calculated for each frequency ratio. Specifically, a graph regarding the frequency ratio and the evaluation value g as shown in FIG. 7 is created based on the evaluation values g obtained for the respective frequency ratios, and the frequency ratio at which the evaluation value g becomes the largest is set as the characteristic frequency ratio. The frequency ratio at which the evaluation value g becomes the largest may be obtained by calculation without using the graph.

Herein, the frequency ratio range in which the change property of the lift coefficient is acquired is preferred to be a range including the characteristic frequency ratio. Although it depends on a wing section, the change property of the lift coefficient is preferred to be acquired in a frequency ratio range of, for example, 0 or more and 1,000 or less. When acquiring the change property of the lift coefficient, first, a pitch width of the frequency ratio is set to about 50 to 100 in the above range, and the tendency of the evaluation value is acquired. Then, the pitch width of the frequency ratio is set to one to ten or smaller in a range in the vicinity of the characteristic frequency at which the evaluation value becomes the largest, and the change property of the lift coefficient is acquired. The frequency ratio range and the pitch width are merely examples and are not limited to the above.

Next, as shown in FIG. 5, the actuator driving frequency of the plasma actuator 30 is set such that the frequency ratio becomes the characteristic frequency ratio that is a characteristic value obtained based on the evaluation value.

Finally, as shown in FIG. 5, the voltage is applied to the electrode pair 31 at the set actuator driving frequency to drive the plasma actuator 30. With this, the flow around the blade 11 is controlled, and the recovery of the lift of the blade 11 is significantly improved.

As described above, in the embodiment, the characteristic frequency ratio that is a characteristic value among the frequency ratios is determined, and the actuator driving frequency is set such that the frequency ratio becomes the characteristic frequency ratio. To be specific, the actuator driving frequency can be set regardless of the relative speed of the air relative to the blade 11. Therefore, the actuator driving frequency does not have to be set for each installation position of the electrode pair 31. Moreover, the setting of the actuator driving frequency does not have to be changed in accordance with the speed and direction of the air flowing toward the blade 11. On this account, according to the flow control method of the embodiment, the actuator driving frequency is easily set, and the recovery of the lift of the blade 11 is significantly improved.

In addition, in the embodiment, the characteristic frequency ratio is determined based on the evaluation value g calculated from the change property of the lift coefficient of the blade 11. Therefore, the actuator driving frequency is set such that the blade 11 obtains an appropriate lift coefficient. Moreover, the characteristic frequency ratio is uniformly determined. Therefore, since the plasma actuator 30 is only required to be driven at a specific frequency, a driving device (power supply) can be reduced in size.

The disclosed technology is applicable to other apparatuses that suppress the stall of the blade. For example, the disclosed technology is applicable to a method of setting an air ejection frequency of an air ejection apparatus that suppresses the stall of the blade by ejecting air from the vicinity of the front edge of the blade at a predetermined air ejection frequency. In this case, in the above embodiment, the "actuator driving frequency" is only required to be read as the "air ejection frequency."

Moreover, the embodiment has explained a case where the angle of attack of the blade 11 changes by the change of the pitch angle of the blade 11. However, the same control as above is applicable to a case where, for example, the angle of attack of the blade 11 changes by the change of the angle of the air current relative to the blade 11 in a state where the pitch angle of the blade 11 is constant. In this case, when a changing frequency of the angle of the air current relative to the blade 11 is set as the "angle of attack changing frequency," a ratio of the actuator driving frequency to the angle of attack changing frequency is the above-described frequency ratio.

What is claimed is:

1. A flow control method of controlling flow around a blade of a rotary wing, a plasma actuator being disposed at the blade,
the flow control method comprising:
   determining a characteristic frequency ratio that is a characteristic value among frequency ratios, each of the frequency ratios being a ratio between an actuator driving frequency and an angle of attack changing frequency, the actuator driving frequency being a frequency of an applied voltage applied to the plasma actuator, the angle of attack changing frequency being a frequency at which an angle of attack of the blade changes in accordance with a rotation angle of the blade;
   setting the actuator driving frequency such that the frequency ratio becomes the characteristic frequency ratio; and
   applying a voltage of the set actuator driving frequency to the plasma actuator to control the flow around the blade.

2. The flow control method according to claim 1, further comprising:
   acquiring in advance a change property of a lift coefficient for each frequency ratio, the lift coefficient changing in accordance with the angle of attack of the blade; and
   calculating an evaluation value regarding the lift coefficient for each frequency ratio based on the acquired change property of the lift coefficient, wherein the characteristic frequency ratio is determined based on the evaluation value.

3. The flow control method according to claim 2, wherein the evaluation value is a value obtained by using at least one of a value regarding an integrated value of the lift coefficient, a value regarding a maximum value of the lift coefficient, or a value regarding a minimum value of the lift coefficient after stall of the blade.

4. The flow control method according to claim 2, wherein the evaluation value is a value obtained by using at least one of:
 a first determination reference value that is a value regarding a ratio between an integrated value of the lift coefficient per one cycle of change of the angle of attack when the plasma actuator is driven and an integrated value of the lift coefficient per one cycle of the change of the angle of attack when the plasma actuator is not driven;
 a second determination reference value that is a value regarding a ratio between a maximum value of the lift coefficient in one cycle of the change of the angle of attack when the plasma actuator is driven and a maximum value of the lift coefficient in one cycle of the change of the angle of attack when the plasma actuator is not driven; or
 a third determination reference value that is a value regarding a ratio between a minimum value of the lift coefficient in a predetermined period of time from a point of time at which the lift coefficient becomes largest in one cycle of the change of the angle of attack when the plasma actuator is driven and a minimum value of the lift coefficient in a predetermined period of time from a point of time at which the lift coefficient becomes largest in one cycle of the change of the angle of attack when the plasma actuator is not driven.

5. The flow control method according to claim 4, wherein the evaluation value is calculated based on a product of the first determination reference value, the second determination reference value, and the third determination reference value.

6. A rotary wing unit comprising:
 a rotary wing including a blade;
 a cyclic pitch controller that periodically changes an angle of attack of the blade at a predetermined angle of attack changing frequency in accordance with a rotation angle of the blade; and
 a plasma actuator disposed at the blade, wherein
 a voltage of an actuator driving frequency is applied to the plasma actuator, the actuator driving frequency being a frequency of an applied voltage applied to the plasma actuator, the actuator driving frequency being set such that a frequency ratio that is a ratio between the actuator driving frequency and the angle of attack changing frequency becomes a characteristic frequency ratio that is a characteristic value.

\* \* \* \* \*